United States Patent
Kim et al.

(10) Patent No.: US 6,714,692 B1
(45) Date of Patent: Mar. 30, 2004

(54) IMAGE SCALING METHOD AND APPARATUS USING CONTINUOUS DOMAIN FILTERING AND INTERPOLATION METHOD

(75) Inventors: Lee Sup Kim, Taejun (KR); Jin Aeon Lee, Taejun (KR)

(73) Assignee: Korea Advanced Institute of Science and Technology, Taejun (KR)

( * ) Notice: Subject to any disclaimer, the term of this patent is extended or adjusted under 35 U.S.C. 154(b) by 0 days.

(21) Appl. No.: 09/568,909

(22) Filed: May 11, 2000

(30) Foreign Application Priority Data

Feb. 16, 2000 (KR) .......................................... 2000-7365

(51) Int. Cl.[7] ................................................ G06T 3/40
(52) U.S. Cl. .......................................... 382/299; 382/300
(58) Field of Search .............................. 382/298, 299, 382/300

(56) References Cited

U.S. PATENT DOCUMENTS

| | | | |
|---|---|---|---|
| 4,150,401 A | * | 4/1979 | Yamamoto et al. ......... 382/299 |
| 5,384,904 A | | 1/1995 | Sprague et al. |
| 5,410,616 A | | 4/1995 | Kidd |
| 5,418,626 A | * | 5/1995 | Semasa ..................... 358/451 |
| 5,500,744 A | | 3/1996 | Sabath |
| 5,511,137 A | * | 4/1996 | Okada ........................ 382/298 |
| 5,671,298 A | | 9/1997 | Markandey et al. |
| 5,717,793 A | * | 2/1998 | Ushida et al. ............... 382/298 |
| 5,889,895 A | | 3/1999 | Wong et al. |
| 5,937,108 A | * | 8/1999 | Harris ........................ 382/298 |
| 2003/0039407 A1 | * | 2/2003 | Okada ........................ 382/298 |

FOREIGN PATENT DOCUMENTS

JP          02094867 A  *  4/1990  .......... H04N/1/393

* cited by examiner

*Primary Examiner*—Jon Chang
(74) *Attorney, Agent, or Firm*—Akin Gump Strauss Hauer & Feld L.L.P.

(57) ABSTRACT

An image scaling method and apparatus converting an input image into an aimed image with suitable resolution for application, in the case that the input image and the aimed image are different in resolution, using continuous domain filtering and interpolation method. The invention utilizes domain filter of regular square type and generates filter coefficient based on area occupancy ratio of filter window according to the area of corresponding pixel extending the applied filter window and then obtains scaled image through the method of computing weighted average value, which is determined through multiplication of the generated filter coefficient and value of each pixel. By using image scaling method of the invention, there is an advantage of much lower cost in hardware implementation of an image scaler in comparison with conventional image scaling methods.

5 Claims, 3 Drawing Sheets

IMAGE SCALING METHOD AND APPARATUS USING CONTINUOUS DOMAIN FILTERING AND INTERPOLATION METHOD

TECHNICAL FIELD

The present invention relates to an image scaling method and apparatus converting an input image into a desired image with suitable resolution for application, in the case that the input image and the desired image for application are different in resolution, and more particularly to an image scaling method and apparatus using domain filtering and interpolation method.

BACKGROUND OF THE INVENTION

As various kinds of digital display apparatuses are popularized, several types of image formats have been utilized.

Generally, images of which resolutions are different from each other are applied to these image formats and therefore the need to convert resolution of an input image arises to adapt to an image display apparatus.

Particularly, real-time conversion of images should be performed in the display of moving images, therefore, the development of the image scaling hardware being of high quality and low cost has been rising in order to achieve those aims.

And particularly, because the resolution of digital display such as TFT-LCD (Thin Film Transistor-Liquid Crystal Display) is fixed according to products, it is requisite to convert various resolutions of input images into the resolution of display itself.

There are many related conventional technologies such as U.S. patent documents including U.S. Pat. Nos. 5,889,895, 5,671,298, 5,500,744, etc.

However, conventional image scaling hardware had several disadvantages in order to be used commonly or commercially, which include low quality of image caused by only repeating pixels and then displaying them, or high cost caused by excessive load of operation and the need of complicated hardware structure.

BRIEF SUMMARY OF THE INVENTION

The present invention relates to an image scaling method and apparatus converting an input image into a desired image with suitable resolution for application, in the case that the input image and the desired image are different in resolution.

A method for image scaling to convert an input image into a desired image with suitable resolution for application is provided. The method comprises:
  (a) computing a position of a filter window by setting up the filter window after placing a lattice of pixels with suitable resolution for application on an original image;
  (b) determining an area occupancy ratio of the filter window on pixies of the original image from the computed position of the filter widow; and
  (c) obtaining a finally filtered image by using the determined area occupancy ratio as a filter coefficient.

Preferibly, the image scaling is performed using domain filtering and/or interpolation method.

Preferably, the position of the filter window is center coordinates and boundary coordinates of the filter window.

More preferably, step (a) further comprises, in the case of magnifying the image:
  adding as much as a width of the filter window to x-coordinate values of previous or initial filter window, while moving horizontally; and
  adding as much as a width of the filter window to y-coordinate values of previous or initial filter window, while moving vertically.

Preferably, step (b) further comprises:
  comparing integer values of center coordinates of the filter window with integer values of four vertexes coordinates and then examining whether the center of the filter window extends adjacent pixels in all directions including the right, left, up, and down sides;
  computing an overlapped distance value of the filter window on adjacent pixels, in the case that the center of the filter window extends adjacent pixels in all directions including the right, left, up, and down sides;
  determininig a partial area value of the filter window extending adjacent pixels using the overlapped distance value; and
  obtaining the area occupancy ratio through multiplication of a scale factor and the partial area value, and wherein the scale factor is expressed as $$\text{Scale Factor} = \frac{1.0}{(\text{width of filter window} \times \text{height of filter window})}.$$

More preferably, step (c) further comprises:
  sorting the area occupancy ratio in the order of magnitude; and
  improving an image quality by altering a weight value through the method of subtracting some constant value from the coefficient value with smaller area ratio and then adding the subtracted constant value to the coefficient value with larger area ratio.

An image scaling apparatus converting an input image into a desired image with suitable resolution for application is provided. The apparatus comprising:
  filter coefficient generating means which consists of a filter window interpolator for computing a position of a filter window, and a filter coefficient generator for generating a filter coefficient through a multiplication of a scale factor and pixel's occupancy area value of the filter window, which is determined from the output value of the filter window interpolator; and
  an image generating filter for generating a finally scaled image by utilizing the filter coefficient obtained from the filter coefficient generating means.

Preferably, the apparatus further comprises a prescaler for previously reducing the input image by $2^n$ times (n: integer), in the case of reducing the input image to the image smaller than a half (½) of itself in either vertical or horizontal direction.

A recording apparatus being able to read the program converting an input image into a desired image with suitable resolution for application through the computer in which the program is recorded, the program comprises:
  computing a position of a filter window by setting up the filter window after placing lattice of pixels with suitable resolution for application on an original image;
  determining an area occupancy ratio of filter window on pixels of the original image data from the computed position of the filter widow; and
  obtaining a finally filtered image by using the determined area occupancy ratio as a filter coefficient.

BRIEF DESCRIPTION OF THE SEVERAL VIEWS OF THE DRAWINGS

The embodiments of the present invention will be explained with reference to the accompanying drawings, in which.

DETAILED DESCRIPTION OF THE INVENTION

The followings give detailed explanation of the invention by referring to accompanied drawings.

Figure 1:
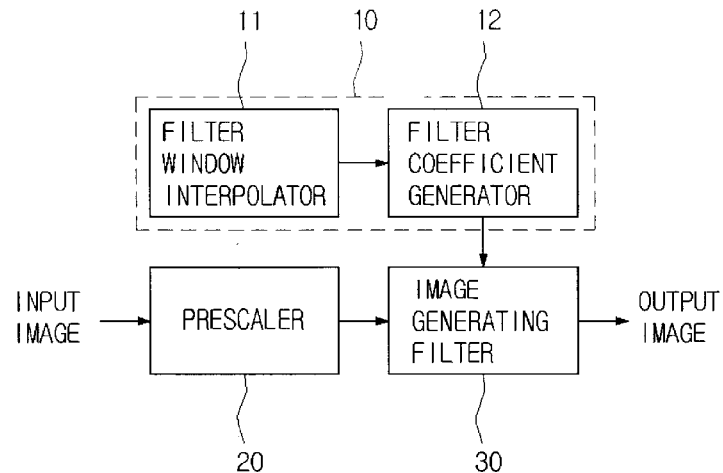
FIG. 1 illustrates a block diagram of an image scaling apparatus using domain filtering and interpolation method according to the present invention.

FIG. 1 illustrates a block diagram of an image scaling apparatus using domain filtering and an interpolation method according to the present invention.

As shown in FIG. 1, filter window interpolator 11 which is computing the position (center coordinates and boundary coordinates) of a filter window, filter coefficient generating part 10 which is composed of filter coefficient generator 12, which is generating filter coefficient through multiplication of scale factor and pixels occupancy area value of filter window which is obtained by using output value (center of filter window and coordinate values of four vertexes) of above filter window interpolator 11, prescaler 20 which is previously reducing an input image by $2^n$ times (n: integer), in the case of reducing an input image to the image smaller than a half (½) of itself in either vertical or horizontal direction, and image generating filter 30 which is generating finally scaled image by using filter coefficient determined from the above filter coefficient generating means.

To implement domain filtering by using the above mentioned image scaling apparatus, there are important considerations such as setting up the filter window and generation of a filter coefficient.

Figure 2:
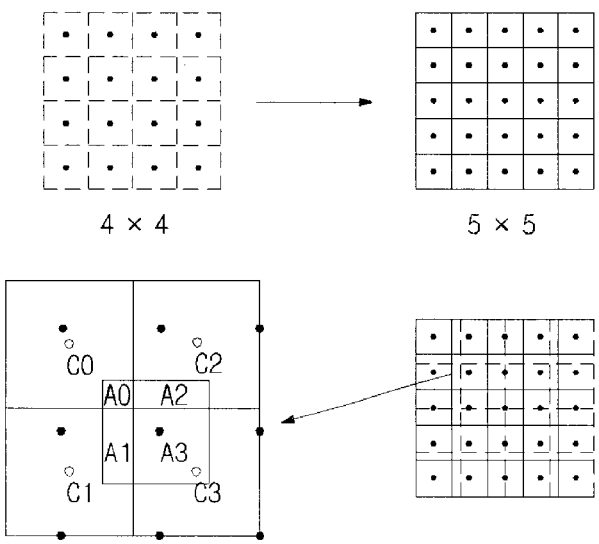
FIG. 2 is a conceptual drawing of an image magnification using domain filtering and interpolation method.

FIG. 2 is a conceptual drawing of an image magnification according to the present invention.

The figure exemplifies the case of magnifying an image with 4×4 resolution into the image with 5×5 resolution. In the case of magnifying into the image with higher resolution than that of an input image, as shown in FIG. 2, it is understood that each lattice of pixels becomes a filter window by placing the pixel's lattice with desired resolution on the original image.

The lower left side of FIG. 2 shows that each pixel obtained through scaling is determined by using the area ratio of pixel, in which filter window occupies each pixel of the original image extending filter window, as weight value.

As shown in FIG. 2, and in accordance with the invention, the maximum number of pixels of the original image included in filtering should be four (4) to obtain a scaled image of one pixel and two lines should be needed in the case of seeing in the vertical direction. That is, regardless of the scaling magnification ratio, it can be achieved by memory with only two line buffers.

The movement of the filter window is simply solved by using a linear interpolation method. That is, in the case that the filter window moves in the horizontal direction, it can be solved by adding the width of the filter window to the x-coordinate value, while in the case that the filter window moves in the vertical direction, by adding the height of the filter window to the y-coordinate value.

Herein, because the filter coefficient is solved by using an area occupancy ratio, it should be made to be changed according to the movement in either the vertical or the horizontal direction by setting up center of filler window and coordinate values of the four (4) vertexes in the filter interpolator 11, in order to compute the partial occupancy area of the pixel (A0~A3 shown in FIG. 2) easily. The computation of partial occupancy area can be done in the output value (center coordinates and boundary coordinates of the filter window) of the filter window interpolator 11.

Figure 3:
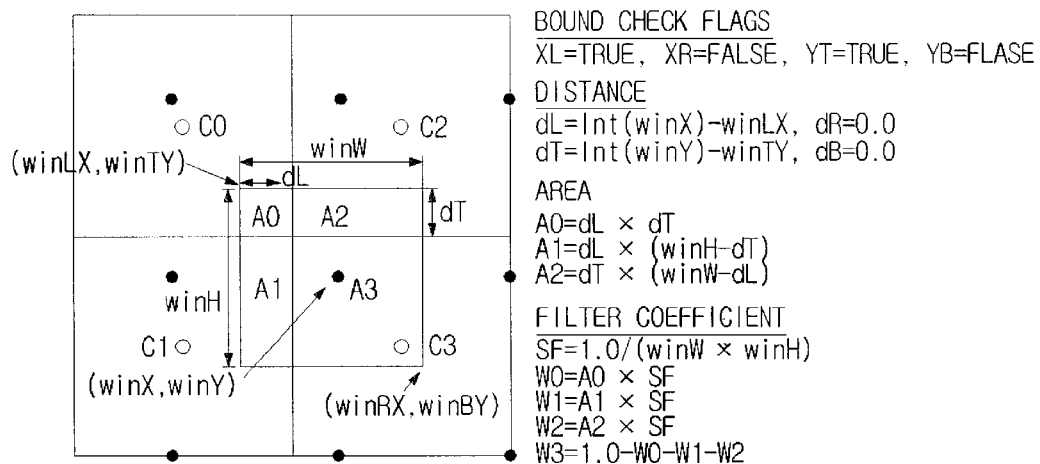
FIG. 3 is an explanatory drawing showing computation process of filter coefficient and pixel's area occupancy ratio of filter window.

FIG. 3 is a drawing for explaining computation process of the filter coefficient in detail.

The position of the filter window is computed by an adder (not shown in FIG. 3) of the filter window interpolator 11 and occupancy areas of pixels (A0~A2, but A3 is not necessary to be computed) are determined by the filter coefficient generator 12, and then the filter coefficient is obtained through the multiplication of the area value and a scale factor. Due to the use of all 8-bit value for the filter coefficient, it is also appropriate that the area value have precision of 8-bit in the implementation of practical hardware.

The computation of filter coefficient is composed of following steps:

(a) comparing integer values of center coordinates of the filter window with integer values of boundary coordinates of filter window and then examining whether the center of the filter window extends adjacent pixels in all directions including the right, left, up, and down sides (in FIG. 3, XL=True, XR=False, YT=True, and YB=False, that is, filter window extends pixels in left and up side from the center of the filter window).

(b) computing overlapped distance value of the filter window (in FIG. 3, DL and DT) on adjacent pixels, in the case that the center of filter window extends adjacent pixels in all directions including the right, left, up, and down sides (however, in the case that the center of the filter window does not extend adjacent pixels in all directions, this computation is unnecessary since the pixel of input image is intactly output.)

(c) determining the partial area value of the filter window extending adjacent pixels using the overlapped distance value; and (d) obtaining the area occupancy ratio through the multiplication of the scale factor and the determined partial area value.

Here, the scale factor (SF) is the reciprocal of the multiplication of the width of the filter window (winW) and the height of the filter window (winH) that is, expressed as follows.

$$SF = \frac{1.0}{(winW \times winH)}$$

By using the area ratio as the filter coefficient, a finally filtered image is obtained in the image generating filter 30 shown in FIG. 1 and the finally filtered image expressed as following equation $$C = C0 \cdot W1 + C1 \cdot W2 + C3 \cdot W3$$

Where, C means finally filtered image. C0 through C3 are input images, and W0 through W3 are filter coefficients.

Herein, filter coefficient can be used either by using the area value itself or by giving larger weight value in the pixel occupying wider area.

The latter case can be applied by altering the weight value through the method of sorting area occupancy ratios in the order of magnitude, and then subtracting some constant value from the coefficient value with a smaller area ratio and adding the subtracted constant value to the coefficient value with a larger area ratio.

And herein, there are several methods of altering the weight value. The prerequisite is that the sum of filter coefficients should be 1.0 and larger weight be given to the coefficient with the larger area ratio and finally hardware implementation be simple.

The simplest method in hardware implementation is adding several LSB bits of the smallest filter coefficient to the coefficient with the largest weight and then making the LSB of the smallest value to be 0.

And method of controlling weighting by using numerical function can make better image.

The size of filter window is determined according to thie magnification ratio of the x- and y-direction, respectively. In the case that the height and width of a pixel of original image is 1.0, respectively, the width and height of the filter window is expressed by the following equations:

$$\text{Width of Filter Window} = \frac{1.0}{x - \text{directional magnification ratio}}$$

$$\text{Height of Filter Window} = \frac{1.0}{y - \text{directional magnification ratio}}$$

Figure 4:
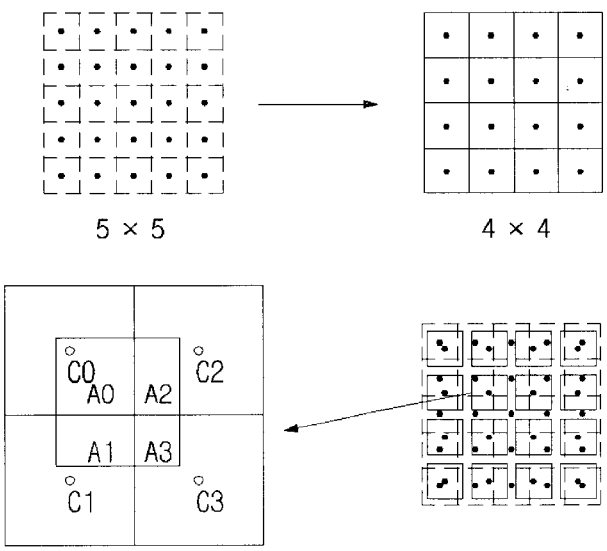
FIG. 4 is a conceptual drawing of image reduction using domain filtering and interpolation method.

FIG. 4 is a conceptual drawing of image reduction.

The difference from the case of image magnification is that the size of the filter window is fixed to 1.0 in the horizontal and vertical direction, respectively, and the movement of the filter window is larger than 1.0.

In other words, the incremental value of filter window interpolator 11 is set up as a value larger than 1.0.

Scale down factor of prescaler 20 and the incremental value of the filter window interpolator 11 are independently computed from each other in the direction of x and y and can be solved by following equations:

$$w_{Ratio} = \frac{\text{horizontal resolution of input image}}{\text{horizontal resolution of output image}}$$

Integer $w$: $2^w \leq w_{Ratio} < 2^{w+1}$ horizontal scale factor of prescaler $= 2^w$ $x$ – directional incremental value of filter window =

$$\frac{\text{horizontal resoltion of input image}}{(\text{horizontal resoltion of output image} \times 2^w)}$$

$$h_{Ratio} = \frac{\text{vertical resoltion of input image}}{\text{vertical resoltion of output image}}$$

Integer $h$: $2^h \leq h_{Ratio} < 2^{h+1}$ vertical scale factor of prescaler $= 2^h$ $y$ – directional incremental value of filter window =

$$\frac{\text{vertical resoltion of input image}}{(\text{vertical resoltion of output image} \times 2^h)}$$

Also, similar to image magnification, image reduction can be independently performed in the either the horizontal or vertical direction and, in the case of reducing the image by a reduction ratio smaller than a half (½), the reduction ratio should be put in the range of a half (½) to one (1) by reducing the image by $2^n$ times (n: integer) in the prescaler 20.

Prescaler 20 can be composed of one line buffer and adder for adding the signal value of the input image as much as an integer multiple scale down factor in the direction of x and y.

Figure 5A:
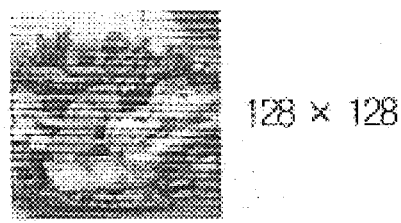
FIGS. 5A–5C are an exemplifying drawing of image scaling according to the present invention.
Figure 5B:
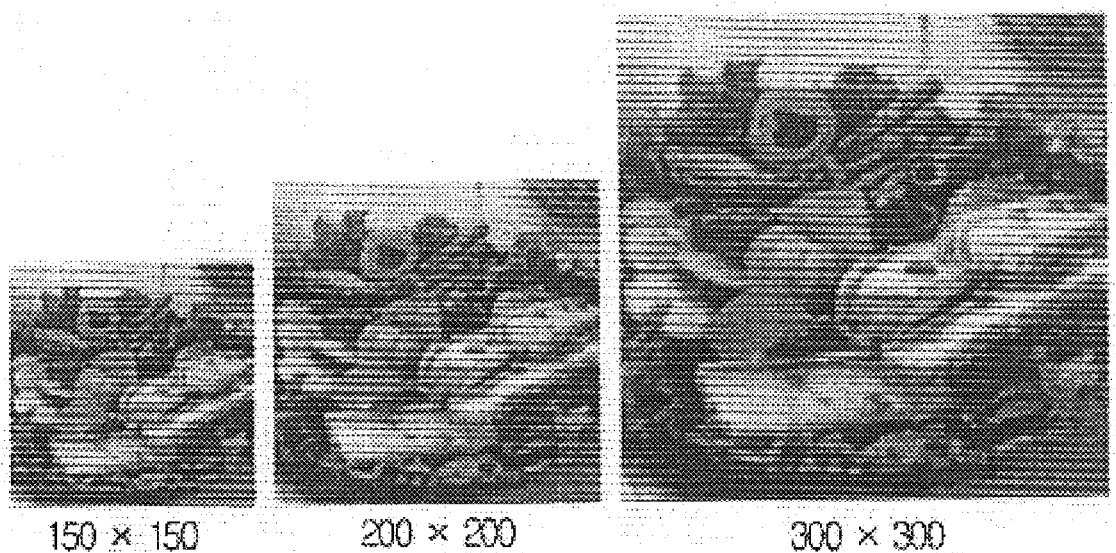

FIGS. 5A–5B exemplify the case of image magnification and reduction according to the present invention.

Figure 5C:
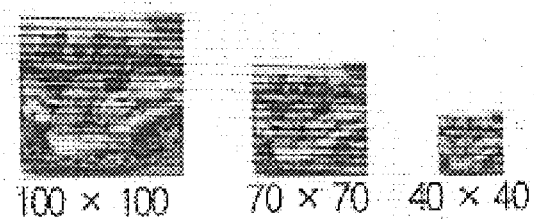

FIG. 5A shows an original image with 128×128 resolution, FIG. 5B shows magnified images with resolution of 150×150, 200×200, and 300×300, respectively, and FIG. 5C shows reduced images with resolution of 100×100, 70×70, and 40×40, respectively.

The above mentioned image scaling method of the present invention can be recorded by a recording apparatus that is able to be read through a computer and be processed by a computer.

As stated above, by utilizing the present invention, the following can be achieved by the simple hardware implementation using domain filtering and interpolation method.

First, a very natural output image can be obtained because the method of converting resolution obtains a finally scaled image by using given information itself.

Second, resolution can be changed into an arbitrary size, therefore, a digital display supporting many types of image formats can be easily implemented.

Third, due to the small number of line buffers needed in order to implement the scaler, the hardware cost is very low.

Fourth, the size of the data type needed in order to obtain the filter coefficient and interpolation method is small and the hardware is very simple, therefore, high speed operation can be achieved easily, that is, it can be widely applied to several types of applications.

From the above, the technical concept of the present invention was described with respect to the accompanying drawings, however, those explain only the desirable operation example and do not limit the present invention.

Also, it will be appreciated by those skilled in the art that changes and variations in the embodiments herein can be made without departing from the spirit and scope of the present invention as defined by the following claims.

What we claim:

1. A method for image scaling to convert an input image into a desired image with suitable resolution for application, the method comprising:

(a) computing center coordinates and boundary coordinates of a filter window by setting up the filter window after placing a lattice of pixels with suitable resolution for application on an original image;

(b) determining an area occupancy ratio of the filter window on pixels of the original image from the computed position of the filter widow; and (c) obtaining a finally filtered image by using the determined area occupancy ratio as a filter coefficients,
    wherein step (b) includes: comparing integer values of the center coordinates of the filter window with integer values of the boundary coordinates of the filter window and then examining whether the center of the filter window extends adjacent pixels in all directions including the right, left, up, and down sides; computing an overlapped distance value of the filter window on adjacent pixels, in the case that the center of the filter window extends adjacent pixels in all directions including the right, left, up, and down sides; determining a partial area value of the filter window extending adjacent pixels using the overlapped distance value; and obtaining the area occupancy ratio through multiplication of a scale factor and the partial area value, and wherein the scale factor is expressed as $$\text{Scale Factor} = \frac{1.0}{(\text{width of filter window} \times \text{height of filter window})};$$

wherein step (c) includes: sorting the area occupancy ratio in the order of magnitude; and improving an image quality by altering a weight value through the method of subtracting some constant value from the coefficient value with smaller area ratio and then adding the subtracted constant value to the coefficient value with larger area ratio.

2. The method of claim 1, wherein step (a) is performed using an interpolation method and further comprises, in the case of magnifying the image:
adding as much as a width of the filter window to x-coordinate value of previous or initial filter window, while moving horizontally; and
adding as much as a height of the filter window to y-coordinate value of previous or initial filter window, while moving vertically.

3. The method of claim 1, wherein the step (a) is performed using an interpolation method and further comprises, in the case of reducing the image:
adding as much as x-directional incremental value of the filter window to x-coordinate value of previous or initial filter window, while moving horizontally, and wherein the x-directional incremental value of the filter window is represented as following equation; and $$x\text{-directional incremental value of filter window} = \frac{\text{horizontal resolution of input image}}{(\text{horizontal resolution of output image} \times \text{horizontal scale factor of prescaler})}; \text{ and}$$

adding as much as y-directional incremental value of the filter window to y-coordinate value of previous or initial filter window, while moving vertically, and wherein the y-directional incremental value of the filter window is represented as following equation.

$$y\text{-directional incremental value of filter window} = \frac{\text{vertical resolution of input image}}{(\text{vertical resolution of output image} \times \text{vertical scale factor of prescaler})}$$

4. An image scaling apparatus converting an input image into a desired image with suitable resolution for application, the apparatus comprising:
filter coefficient generating means which consists of a filter window interpolator for computing center coordinates and boundary coordinates of a filter window, and a filter coefficient generator for generating a filter coefficient through a multiplication of a scale factor and pixel's occupancy area value of the filter window, which is determined from the output value of the filter window interpolator; and
an image generating filter for generating a finally scaled image by utilizing the filter coefficient obtained from the filter coefficient generating means,
wherein the finally scaled image is obtained by sorting the area occupancy ratio in the order of magnitude, and by improving an image quality by altering a weight value through a method of subtracting some constant value from the coefficient value with smaller area ratio and then adding the subtracted constant value to the coefficient value with larger area ratio.

5. A recording medium being able to read a program converting an input image into a desired image with suitable resolution for application through a computer in which the program is recorded, the program comprising:
computing center coordinates and boundary coordinates of a filter window by setting up the filter window after placing lattice of pixels with suitable resolution for application on an original image;
determining an area occupancy ratio of the filter window on pixels of the original image data from the computed position of the filter widow; and
obtaining a finally filtered image by using the determined area occupancy ratio as a filter coefficient,
wherein step (b) includes: comparing integer values of the center coordinates of the filter window with integer values of the boundary coordinates of the filter window and then examining whether the center of the filter window extends adjacent pixels in all directions including the right, left, up, and down sides, computing an overlapped distance value of the filter window on adjacent pixels, in the case that the center of the filter window extends adjacent pixels in all directions including the right, left, up, and down sides; determining a partial area value of the filter window extending adjacent pixels using the overlapped distance value; and obtaining the area occupancy ratio through multiplication of a scale factor and the partial area value, and wherein the scale factor is expressed as $$\text{Scale Factor} = \frac{1.0}{(\text{width of filter window} \times \text{height of filter window})};$$

wherein step (c) includes the steps of: sorting the area occupancy ratio in the order of magnitude; and improving an image quality by altering a weight value through the method of subtracting some constant value from the coefficient value with smaller area ratio and then adding the subtracted constant value to the coefficient value with larger area ratio.

* * * * *